(12) United States Patent
Honarvar

(10) Patent No.: US 7,076,475 B2
(45) Date of Patent: *Jul. 11, 2006

(54) DECISION MANAGEMENT SYSTEM PROVIDING QUALITATIVE ACCOUNT/CUSTOMER ASSESSMENT VIA POINT IN TIME SIMULATION

(75) Inventor: Laurence Honarvar, Arnold, MD (US)

(73) Assignee: Americam Management Systems, Inc., Fairfax, VA (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/718,585

(22) Filed: Nov. 24, 2003

(65) Prior Publication Data

US 2004/0107132 A1    Jun. 3, 2004

Related U.S. Application Data

(60) Division of application No. 10/127,445, filed on Apr. 23, 2002, now Pat. No. 6,684,192, which is a continuation of application No. 09/258,348, filed on Feb. 26, 1999, now Pat. No. 6,405,173.

(60) Provisional application No. 60/076,910, filed on Mar. 5, 1998.

(51) Int. Cl.
G06F 15/18    (2006.01)
G06F 17/60    (2006.01)

(52) U.S. Cl. .............. 706/47; 705/7; 705/11; 705/35; 706/45; 717/100; 707/100

(58) Field of Classification Search ........... 706/47, 706/45; 717/100; 705/35; 707/100
See application file for complete search history.

(56) References Cited

U.S. PATENT DOCUMENTS 5,325,505 A    6/1994    Hoffecker et al. ......... 395/425
5,701,400 A *  12/1997   Amado .................... 706/45
5,875,431 A    2/1999    Heckman et al. .......... 705/7
5,999,908 A    12/1999   Abelow ................... 705/1
6,009,407 A    12/1999   Garg ...................... 705/10
6,098,052 A    8/2000    Kosiba et al. ............ 705/40
6,308,168 B1 * 10/2001   Dovich et al. ............ 707/1
6,321,206 B1 * 11/2001   Honarvar ................. 705/7
6,405,173 B1 * 6/2002    Honarvar et al. ......... 705/7
6,430,545 B1 * 8/2002    Honarvar et al. ......... 706/47

(Continued)

FOREIGN PATENT DOCUMENTS

EP    0770967 A2    2/1997

OTHER PUBLICATIONS

Rahbar et al., "Top-down back-to-front planning,", Transactions of AACE International, 1998, 9 pages.

Primary Examiner—Anthony Knight
Assistant Examiner—Michael B. Holmes
(74) Attorney, Agent, or Firm—Staas & Halsey LLP

(57) ABSTRACT

A computer-implemented decision management system which provides qualitative client assessment via point in time simulation. More specifically, the decision management system (a) simulates the effect of a strategy by applying the strategy to client data, and (b) tracks what type of client traveled through a respective decision point in the strategy during the simulation. Simulation parameters can be selected without technical intervention via, for example, a GUI and a relational data model. Such parameters can include which customers and which client data sample will be used for the simulation, and which inbound events will trigger the strategy. Moreover, detailed and aggregate results can be consolidated to determine expected results from the simulated strategies, and traditional and OLAP reporting facilities can be applied to analyze/view the consolidated results.

16 Claims, 20 Drawing Sheets

U.S. PATENT DOCUMENTS

| | | | |
|---|---|---|---|
| 6,546,545 B1 * | 4/2003 | Honarvar et al. | 717/100 |
| 6,567,814 B1 * | 5/2003 | Bankier et al. | 707/101 |
| 6,571,235 B1 * | 5/2003 | Marpe et al. | 707/3 |
| 6,601,034 B1 * | 7/2003 | Honarvar et al. | 705/7 |
| 6,609,120 B1 * | 8/2003 | Honarvar et al. | 707/3 |
| 6,671,693 B1 * | 12/2003 | Marpe et al. | 707/102 |
| 6,684,192 B1 * | 1/2004 | Honarvar et al. | 705/7 |
| 6,708,155 B1 * | 3/2004 | Honarvar et al. | 705/7 |
| 2002/0116244 A1 * | 8/2002 | Honarvar et al. | 705/7 |
| 2002/0188535 A1 * | 12/2002 | Chao et al. | 705/35 |
| 2003/0120529 A1 * | 6/2003 | Honarvar et al. | 705/7 |
| 2003/0195828 A1 * | 10/2003 | Honarvar et al. | 705/35 |
| 2003/0204426 A1 * | 10/2003 | Honarvar et al. | 705/7 |
| 2004/0148211 A1 * | 7/2004 | Honarvar et al. | 705/7 |

* cited by examiner

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 9

| OBSERVATION TIME | PERFORMANCE TIME | SEGMENT | TEST GROUP | CATEGORY | REPORT GROUP | DELQ | % CREDIT LINE USED | VALUE | PROFIT |
|---|---|---|---|---|---|---|---|---|---|
| 1/98 | 1/98 - 6/98 | 1 | 1 | BRONZE | A | # | # | # | # |
| 1/98 | 1/98 - 6/98 | 1 | 1 | BRONZE | B | # | # | # | # |
| 1/98 | 1/98 - 6/98 | 1 | 1 | BRONZE | C | # | # | # | # |
| 1/98 | 1/98 - 6/98 | 4 | 2 | GOLD | F | # | # | # | # |

DIMENSIONS — METRICS — ACCUMULATED PERFORMANCE DATA

FIG. 12

| DATE | TEST | DESCRIPTION |
|---|---|---|
| 1/98 . . . 6/98 | T1 | TEST 1 |
| 1/98 . . . 6/98 | T2 | TEST 2 |
| 2/98 . . . 3/98 | T3 | TEST 3 |
| 3/98 . . . 9/98 | T4 | TEST 4 |
| 4/98 . . . 10/98 | T5 | TEST 5 |

FIG. 13

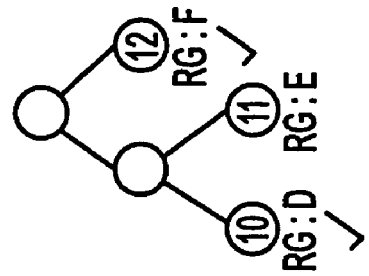
FIG. 14B
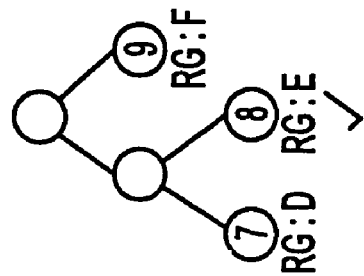
FIG. 14A
| | HIGH RISK | MED RISK | LOW RISK |
|---|---|---|---|
| TRADITIONAL (70%) | 8 | 38 | 24 |
| AGGRESSIVE (30%) | 2 | 22 | 6 |
FIG. 14D
| | HIGH RISK | MED RISK | LOW RISK |
|---|---|---|---|
| TRADITIONAL (70%) | 16 | 38 | 16 |
| AGGRESSIVE (30%) | 5 | 20 | 5 |
FIG. 14C

US 7,076,475 B2

DECISION MANAGEMENT SYSTEM PROVIDING QUALITATIVE ACCOUNT/CUSTOMER ASSESSMENT VIA POINT IN TIME SIMULATION

CROSS REFERENCE TO RELATED APPLICATION

This application is a divisional of application Ser. No. 10/127,445, filed Apr. 23, 2002, now U.S. Pat. No. 6,684,192 which is a continuation of application Ser. No. 09/258,348, filed Feb. 26, 1999, now U.S. Pat. No. 6,405,173 issued Jun. 11, 2002.

This application claims priority to provisional application Ser. No. 60/076,910, filed Mar. 5, 1998, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, and which is incorporated herein by reference.

This application is related to U.S. application titled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, and which is incorporated herein by reference.

This application is related to U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, and which is incorporated herein by reference.

This application is related to U.S. application titled VERSIONING IN A RULES BASED DECISION MANAGEMENT SYSTEM, U.S. Ser. No. 09/219,341, filed Dec. 23, 1998, and which is incorporated herein by reference.

This application is related to U.S. application titled PARAMETER HIERARCHY FOR A DECISION MANAGEMENT SYSTEM, U.S. Ser. No. 09/219,340, filed Dec. 23, 1998, and which is incorporated herein by reference.

This application is related to U.S. application titled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, and which is incorporated herein by reference.

BACKGROUND OF THE INVENTION

1. Field of the Invention

The present invention relates to a decision management system for creating strategies to manage clients, such as customers, accounts, or applicants, of an organization. More specifically, the present invention relates to a decision management system providing simulation for qualitative client assessment.

2. Description of the Related Art

A typical organization maintains a significant amount of information about its clients, where clients refer to the customers, accounts or applicants for services or products of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manger could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefiting from decision support and therefore is yielding less than optimal results.

There are software based products in the marketplace which can organize information to make more effective decisions. For example, the American Management Systems (AMS) Strata™ decision support system release 2.0 (hereinafter Strata™ release 2.0) is a software based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular client event has occurred. Such events may be automatically generated due to client behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a client is assigned to a segment. A segment is a grouping of clients based on a characteristic by which the clients will be separated for applying different rules. Generally, a segment is a high level segregation of clients for the purpose of associating largely independent high level strategy. Segments are completely separate groups of clients, for which a unique set of evaluation processes have been defined. For example, a telecommunications company might have a segment for residential customers and another for business customers.

From step 50, the system moves to step 60, where clients are randomly grouped into different test groups for the purpose of applying competing policy rules, strategy, or experiments. Generally, test groups allow for strategy comparison. Just as in research environments, the behavior or outcomes of an experimental "test" population is compared to that of a "control" group that is not exposed to the experimental treatment. A strategist can specify what percentage of the clients should be randomly assigned to each test group. If the strategy associated with a test group is successful, that strategy may later be deployed to a larger percentage of the clients.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4, once a risk score is computed by risk score 93, this risk score is stored into a variable which may have stored a score computed by the credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a client will be determined by the test group into which the client was assigned. This allows for strategy experimentation by defining a common sequence of processes for a given inbound event, but differentiating the actual mechanism that will be invoked for each process depending on the respective test group into which the client was randomly assigned.

If a process only contains one mechanism, no experimentation will take place in that process since every client, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route clients to the appropriate endpoint. Generally, a decision tree contains layers of rule-driven decision points, or nodes (starting with a root node at the top of the tree), from which clients are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing client strategies.

The above-described decision management system can allow hybrid strategies to be developed, based on the success of different experiments.

For example, FIG. 7 is a diagram illustrating the effectiveness of creating a hybrid strategy in a decision management system, such as Strata™ release 2.0.

Referring now to FIG. 7, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

Unfortunately, the above-described decision management system does not provide simulation capabilities to assess qualitative client information at specific points in time, before a strategy is placed into production.

SUMMARY OF THE INVENTION

Therefore, it is an object of the present invention to provide a decision management system which provides strategy simulation for assessing qualitative and quantitative client information at specific points in time.

Additional objects and advantages of the invention will be set forth in part in the description which follows, and, in part, will be obvious from the description, or may be learned by practice of the invention.

Objects of the present invention are achieved by providing a decision management process which (a) simulates the effect of a strategy by applying the strategy to client data providing information regarding clients, the strategy having decision points; and (b) tracks what type of client traveled through a respective decision point in the strategy during the simulation.

Objects of the present invention are further achieved by providing a decision management process for simulating a strategy, wherein the process (a) selects, without technical intervention, clients from a group of clients; (b) selects, without technical intervention, samples of client data corresponding to the selected clients; (c) selects, without technical intervention, an inbound event which triggers the strategy; (d) applies the strategy to the selected client data upon the occurrence of the selected inbound event; (e) consolidates detailed and aggregate results to determine expected results from the simulated strategies; and (f) applies traditional and OLAP reporting facilities to analyze/view the consolidated results.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 9 is a diagram illustrating a matrix created in a decision management system, for analyzing data and applying strategies, according to an embodiment of the present invention.

FIG. 12 is a diagram illustrating an example of a row of data having a dimensions part and metrics part, according to an embodiment of the present invention.

FIG. 13 is a diagram illustrating a look-up table for a dimension in the row illustrated in FIG. 12, according to an embodiment of the present invention.

FIGS. 14(A), 14(B), 14(C) and 14(D) are diagrams illustrating the operation of a decision management system, according to an embodiment of the present invention.

DESCRIPTION OF THE PREFERRED EMBODIMENTS

Figure 8:
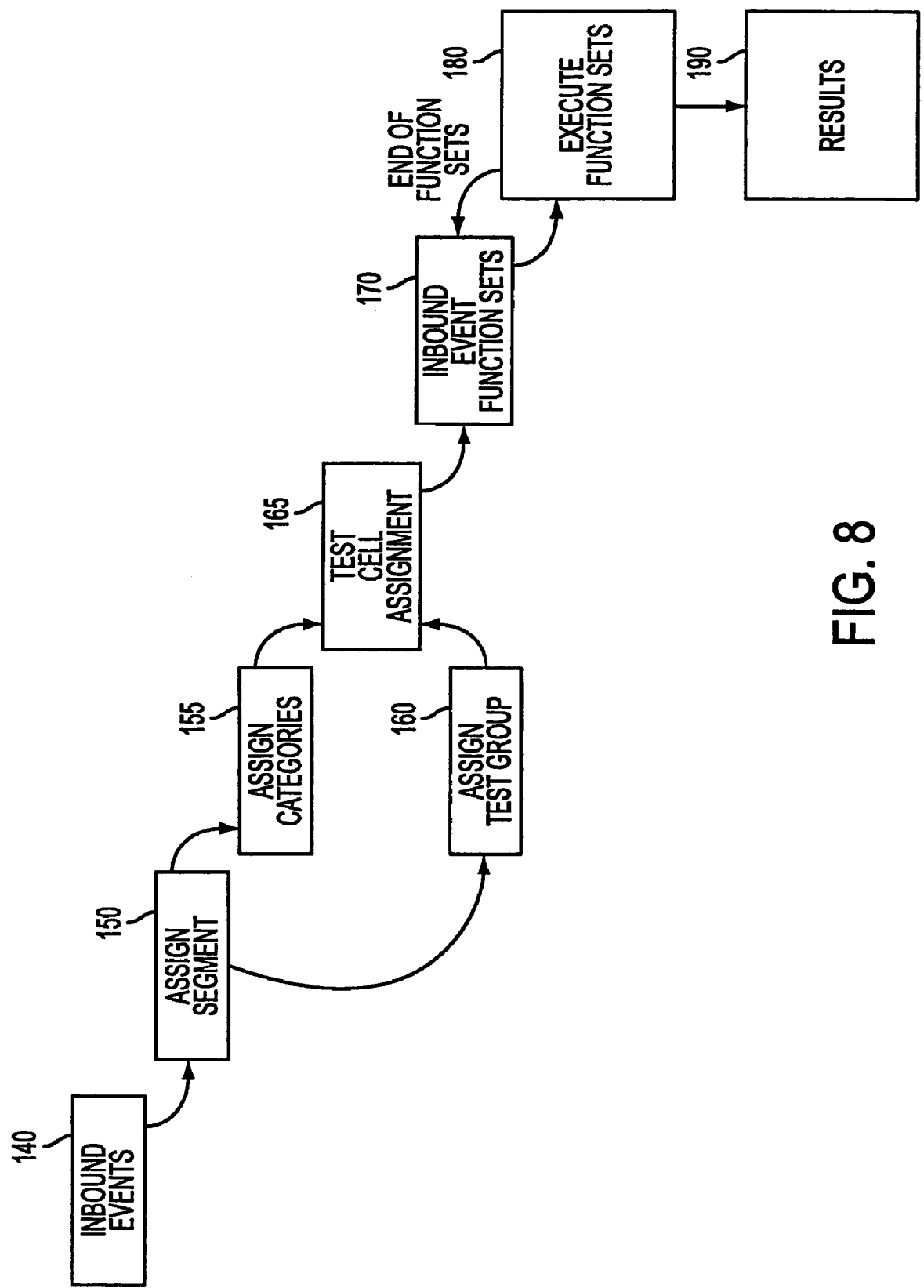
FIG. 8 is a diagram illustrating the functional flow of a decision management system, according to an embodiment of the present invention.

FIG. 8 is a diagram illustrating the functional flow of a decision management system, according to an embodiment of the present invention. Referring now to FIG. 8, in step 140, an inbound event is a trigger that is received from one or more external systems to identify that a particular client event has occurred. Here, a client refers to people or entities which interact with, or do business with, an organization. For example, clients include customers, accounts or applicants for services or products of the organization.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

Figure 1:
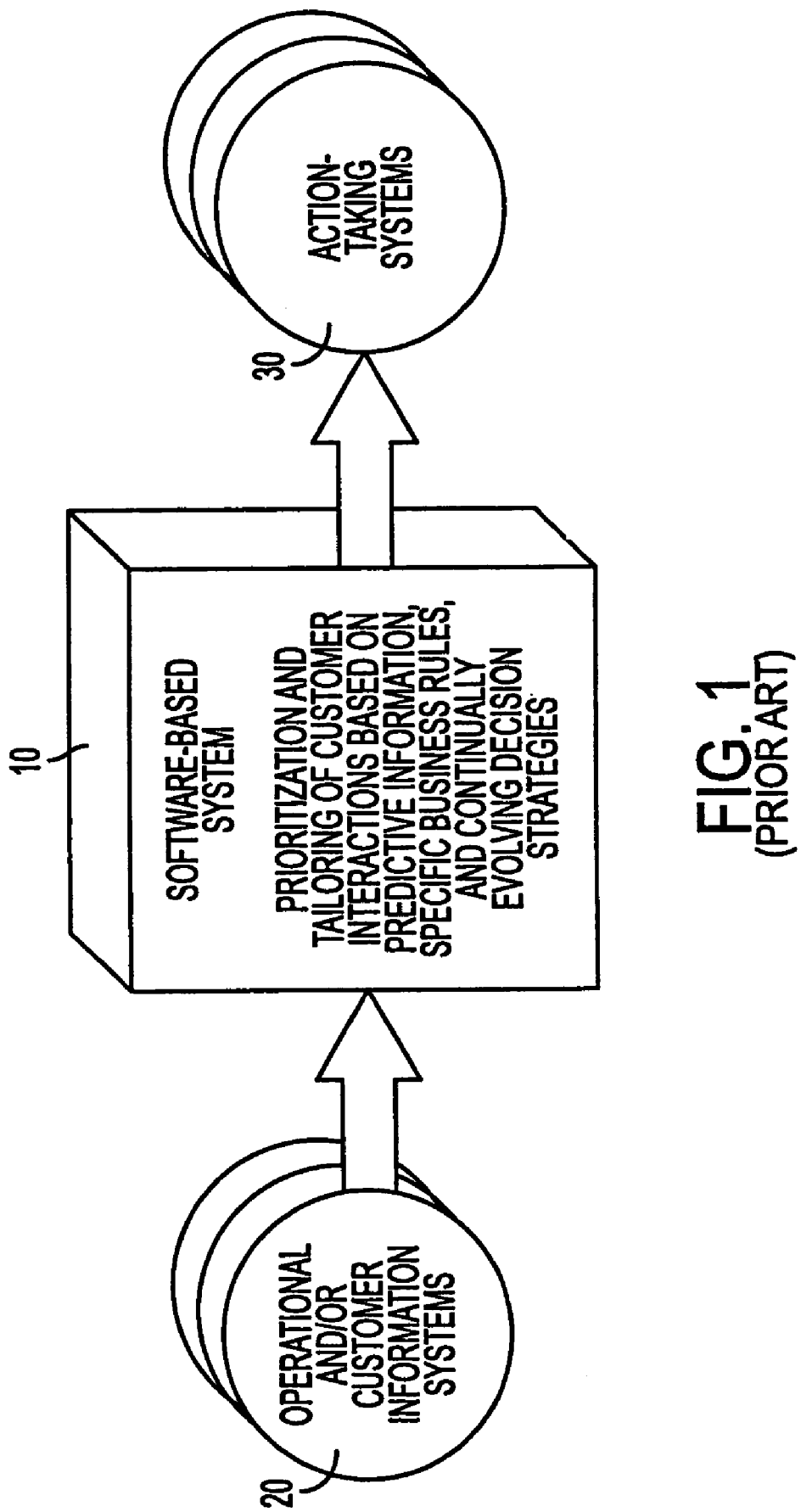
FIG. 1 (prior art) is a diagram illustrating the general concept of a software-based decision management system which applies predictive modeling techniques to customer data.
Figure 2:
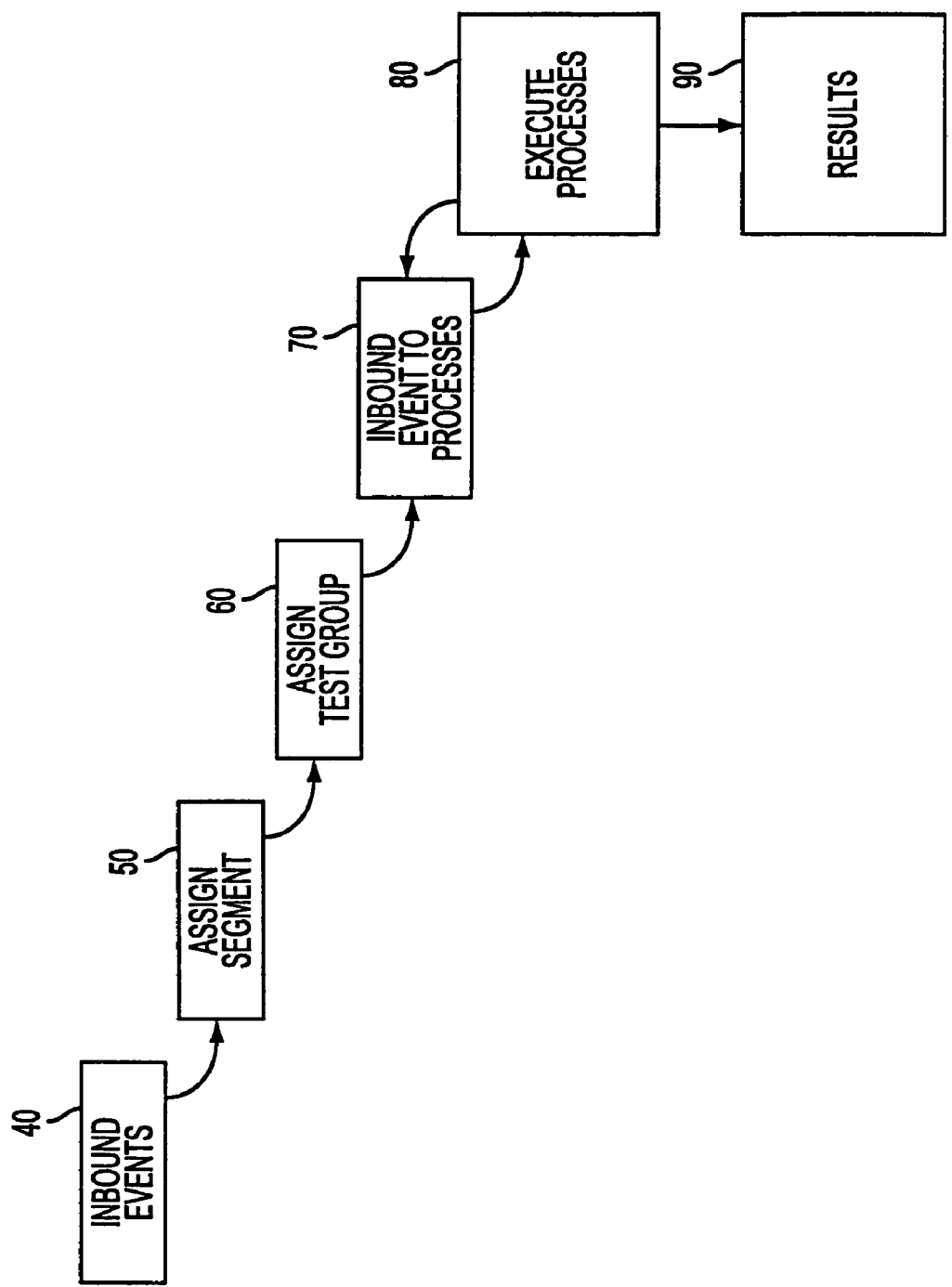
FIG. 2 (prior art) is a more detailed diagram illustrating the operation of a decision management system.
Figure 3:
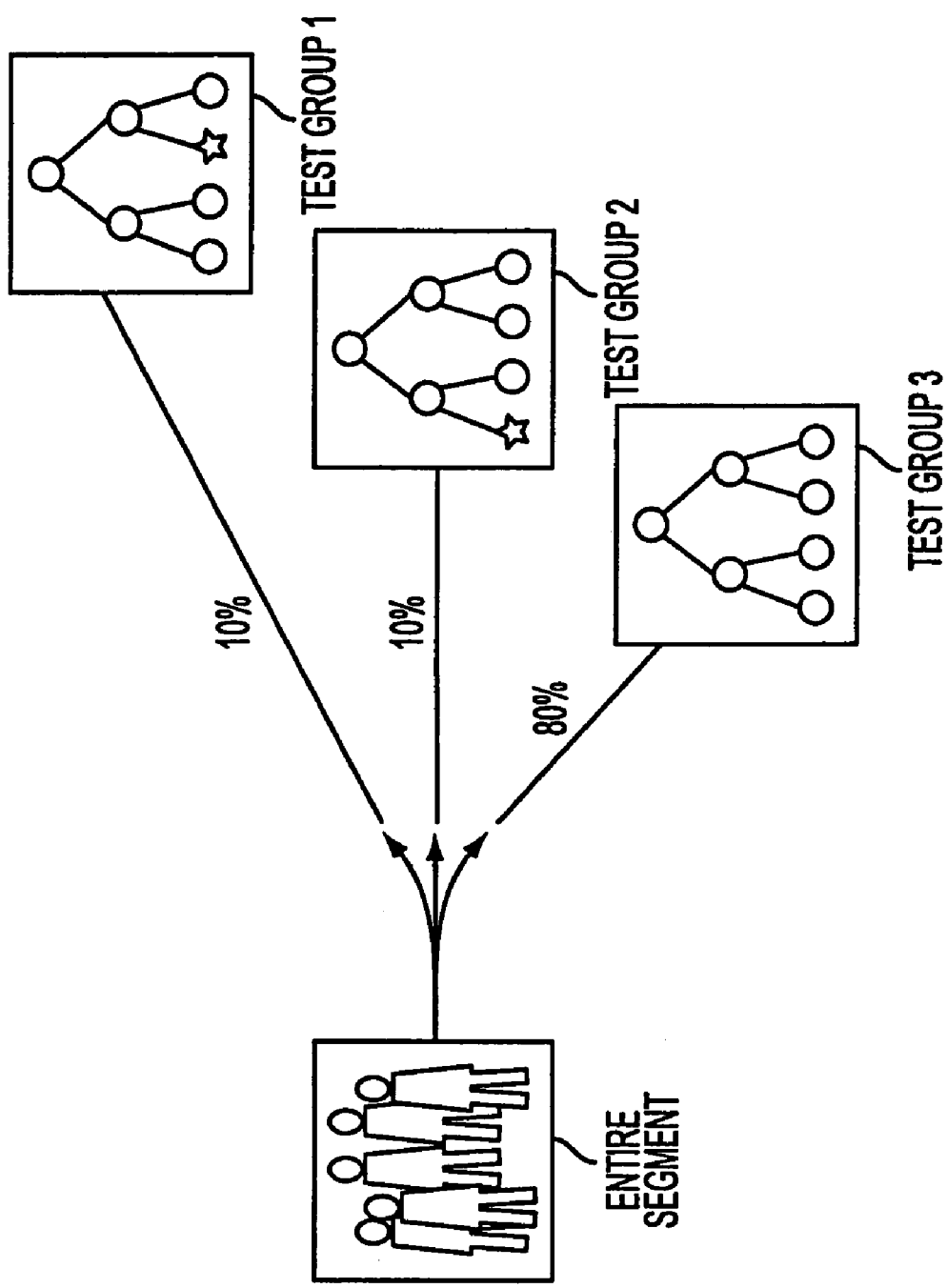
FIG. 3 (prior art) is a diagram illustrating an example of a segment being divided into different test groups in a decision management system.
Figures 4A, 4B:
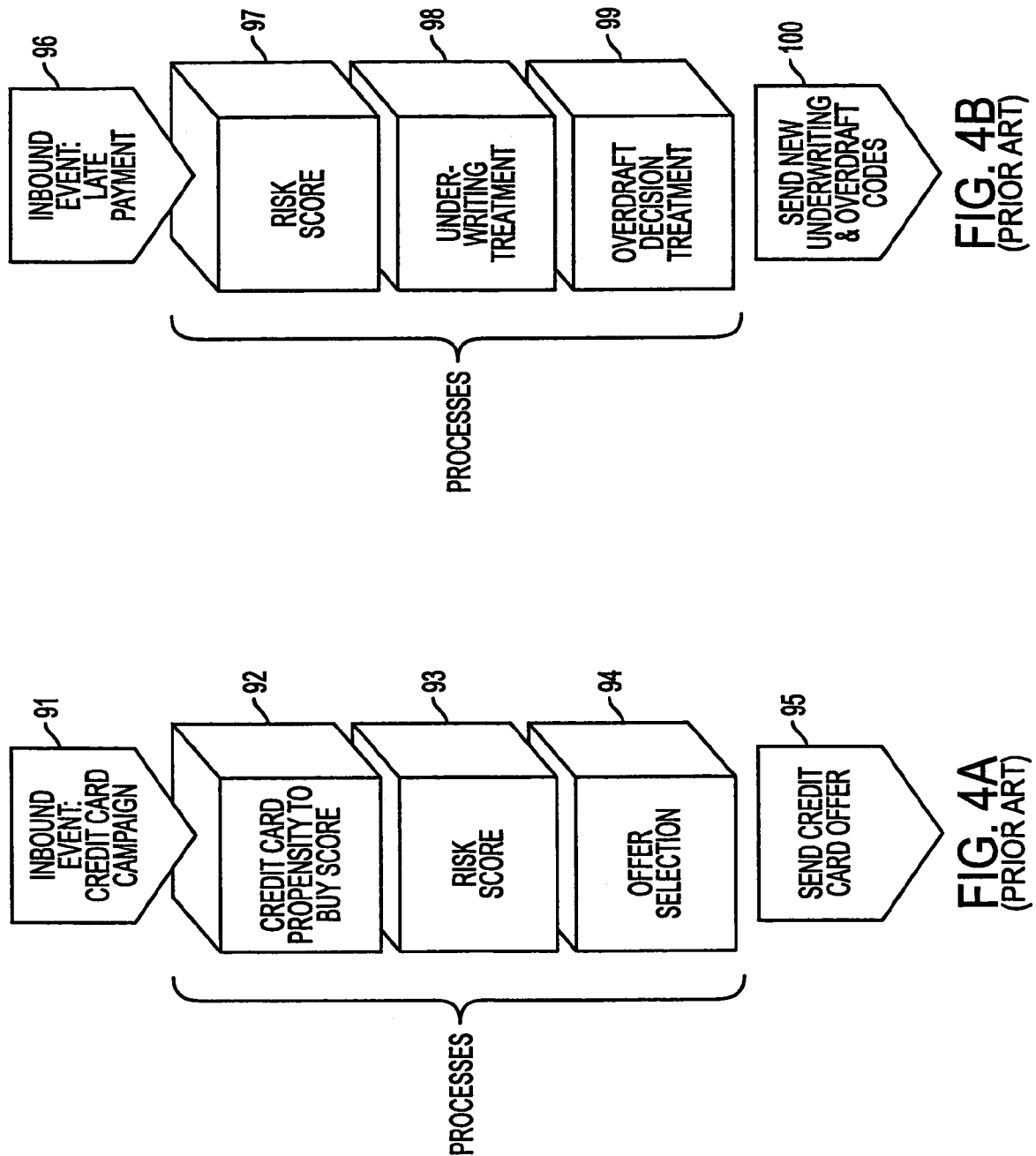
FIGS. 4(A) and 4(B) (prior art) are diagrams illustrating the matching of inbound events to processes in a decision management system.

From step 165 the system moves to step 170, where inbound events are matched to function sets. Here, a function set has a similar meaning as a "process" described, for example, in FIGS. 4(A) and 4(B), but the present invention uses a different terminology.

From step 170, the system moves to step 180, where the specific function sets for one or more specific inbound events are executed.

From step 180, the system moves to step 190, where the results, or action items, are output.

FIG. 9 is a diagram illustrating the creation of a matrix of the categories and test groups for a respective segment, as in step 165 of FIG. 8, according to an embodiment of the present invention. Referring now to FIG. 9, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

Figure 5:
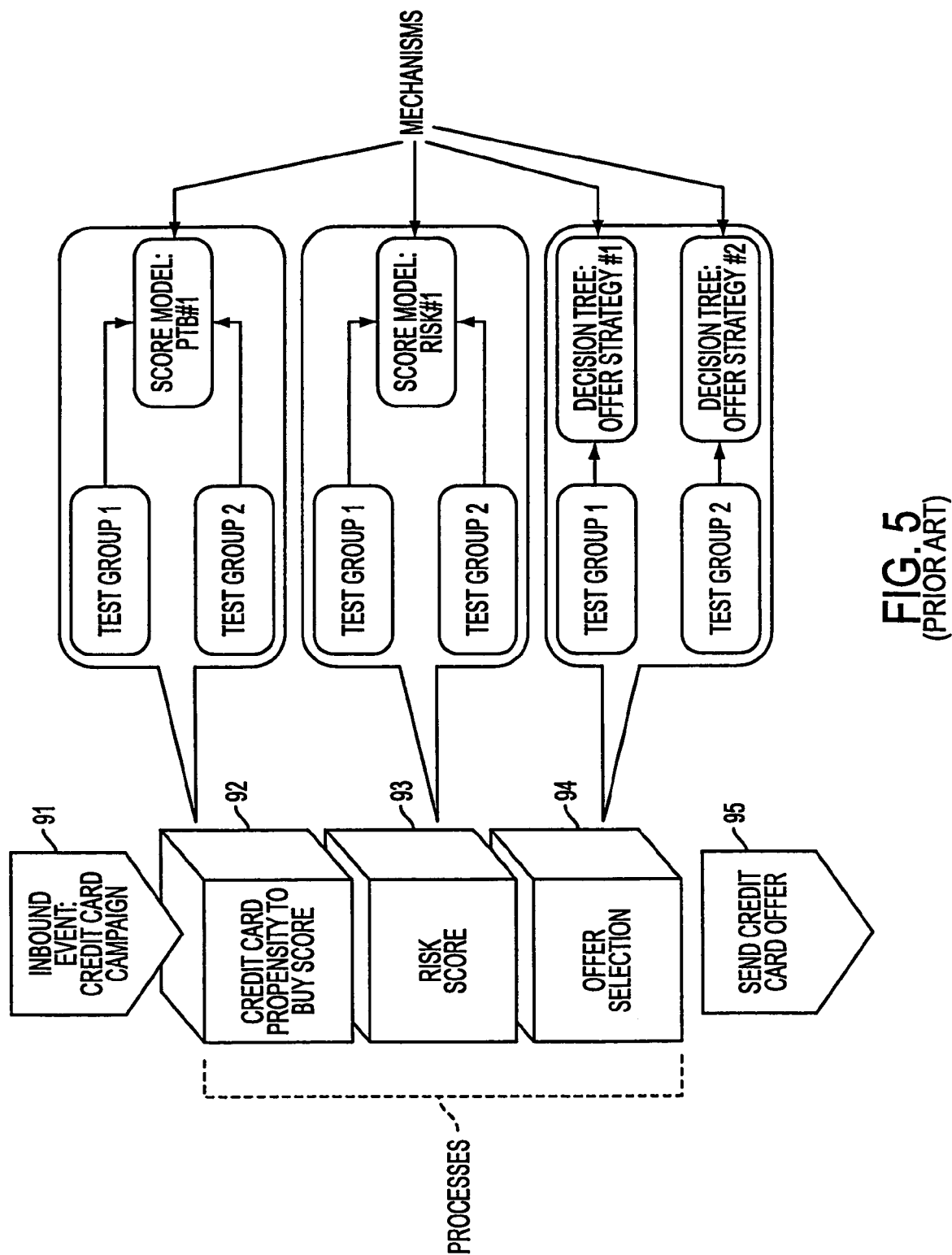
FIG. 5 (prior art) is a diagram illustrating the grouping of mechanisms to processes in a decision management system.
Figure 6:
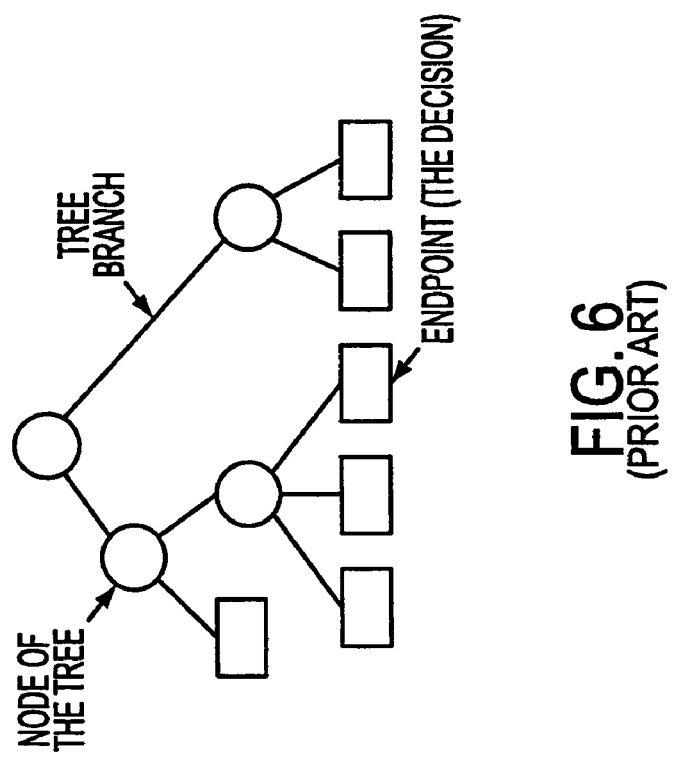
FIG. 6 (prior art) is a diagram illustrating a decision tree.

A function set is formed by one or more functions, where a function can be, for example, a decision tree, a score model, a matrix, a user exit or a list processor. Here, a function has a similar meaning as a "mechanism" described, for example, in FIG. 5, but the present invention uses a different terminology and provides the ability to store each result independently. Moreover, in the conventional system of FIG. 5, user exits and list processors were not available as mechanisms. Thus, generally, the correlation of function sets to functions is similar to that for processes to mechanisms in FIG. 5, but the terminology is different.

Figure 10:
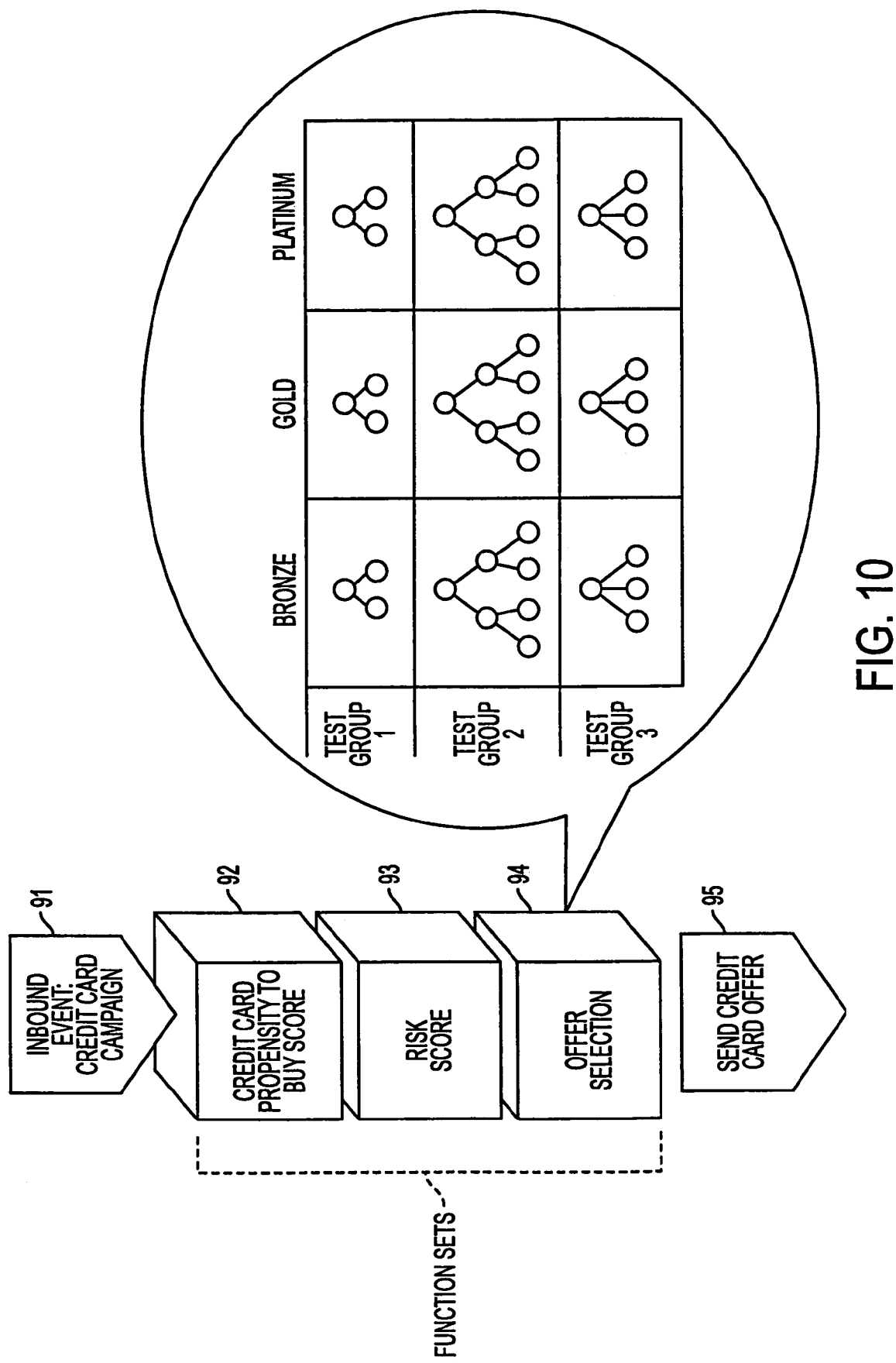
FIG. 10 is a diagram illustrating the correspondence of functions of a respective function set to strategy test cells of a matrix, according to an embodiment of the present invention.

FIG. 10 is a diagram illustrating an example of the correspondence of functions of a respective function set to the strategy test cells of the matrix, according to an embodiment of the present invention. Referring now to FIG. 10, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

Preferably, the structure of the decision tree is the same for a respective test group across each category. For example, in FIG. 10, the tree structure in the strategy test cells for test group 1 are the same for each of the Bronze, Gold and Platinum categories. Of course, the actual decisions made at each node and the branching criteria can be different. Similarly, the tree structure in the strategy test cells for test group 2 are the same for each of the Bronze, Gold and Platinum categories. This allows comparison across categories. The same principle holds across test groups for a given category.

Further, it is not necessary for a function set to have a different function for each strategy test cell. Some, or even all, of the strategy test cells for a respective function set can have the same function, depending on the level of testing which is desired to be performed. The specific design of the functions of a respective function set as they correlate to strategy test cells is a matter of design choice, thereby allowing greater flexibility in configuration of the system.

As a strategy is designed, the strategy test cells will be examined against each other. Preferably, there is a common set of metrics for the entire matrix, where the metrics are the appropriate measurements against which to measure the performance of the strategy defined for a segment. Then, it can be determined how well a test group is shifting customers to other categories. For example, it can be determined how quickly test group 1 is moving Bronze customers into the Platinum category in the matrix of FIG. 9. The opposite undesirable effect can also be assessed.

Although it is preferable to create a data structure which is in "matrix" form for analyzing the movement of clients, the present invention is not intended to be limited to the use of a "matrix." Instead, any data structure which is equivalent to a matrix in providing the required functionality for defining strategy and analyzing the movement of clients will be appropriate. Therefore, generally, many different types of data structures providing an intersection between categories and test groups can be used.

As described above, once clients are placed into categories, the strategy test cells in the matrix are used to design experiments. For example, for the Bronze category, a series of experiments can be designed for each strategy test cell in that category.

In addition, as will be described in more detail below, the decision management system can measure performance so that the overall strategy can be appropriately adjusted to optimize results.

FIGS. 8–10 represent the logical flow of how strategy test cells are created, or assigned. However, the systematic or technical flow may be different. For example, the loop between steps 180 and 170 in FIG. 8 typically executes several function sets. Preferably, all non-test group specific function sets are executed first. These typically include the assessment/execution of predictive algorithms and models. Subsequently, a categorization function set can be executed, to categorize the clients. The categorization function set is generally not test group specific, and often uses the information derived from the function sets that have already been executed. Thereafter, a test cell assignment function set may be executed, to assign clients to specific test cells, or the system user may simply do this implicitly through the definition of rules.

Figure 11:
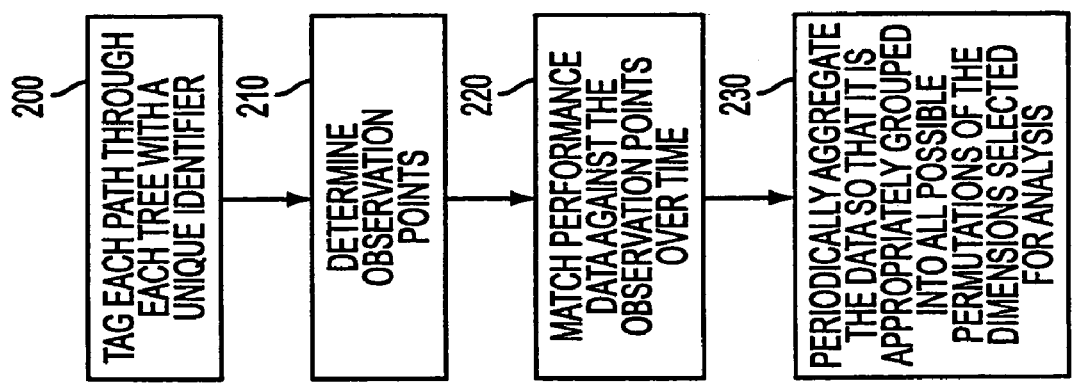
FIG. 11 is a diagram illustrating the overall operation of a decision management system for measuring performance, according to an embodiment of the present invention.

FIG. 11 is a diagram illustrating the overall operation of a decision management system for measuring performance, according to an embodiment of the present invention.

Referring now to FIG. 11, in step 200, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

A report group is a tag which identifies a unique path through a policy, strategy or set of rules, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. Categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy. The concept of tagging a path to measure performance, as with a report group, is known.

All clients in a given report group should be relatively homogenous, the difference being the test group to which they were randomly assigned and thus the action/decision applied to them based on their test group. Since report groups are independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

A decision management system according to the embodiments of the present invention collectively uses test groups, report groups, categories and user-defined, multi-dimensional decision effectiveness reports to quickly determine the most effective strategy for each segment within a client portfolio.

Referring again to FIG. 11, from step 200 the system moves to step 210, where observation points are determined. More specifically, each time a decision is made about a client, that decision is posted. More importantly, the report group that the client passed through is posted. In addition, what segment, category, test group, etc. is posted. This is referred to as an observation point. An observation point is not intended to be limited to posting any specific criteria, so that a strategy analyst has flexibility in determining what data should be posted. Similarly, an observation point is not intended to be limited to only being triggered by decisions. For example, a score model or matrix invocation could trigger an observation.

From step 210, the system moves to step 220, where performance over time for observation points is accumulated, and matched against the observation points. Generally, an observation point is a snap-shot of a point in time, and has dimensions across which analysis of the data can be performed. A specific client can have multiple observation points. Therefore, in step 210 in FIG. 11, observation points for a client are noted. Then, in step 220, for each client, performance data is matched against observation points. For example, once a month, performance data for a client may be obtained. This performance data is then matched, or correlated, to the appropriate observation points for each account and/or customer.

For example, on Jan. 1, 1998, assume that a decision is made to increase a client's credit limit by $500. This information is stored as an observation point. Data stored as part of the observation point's dimensions may be, for example, client ID, what segment the client was in, what category the client was in, what test group the client was in and what report group the client was in when that decision was made.

On Jan. 31, 1998, Feb. 31, 1998, Mar. 31, 1998, etc., some additional performance data may be obtained. For example, how much of the credit line increase was used? Did the client go delinquent on the account? What was the current value of the customer? What was their profitability? For example, over the course of a year, twelve (12) sets of performance data may be obtained for this client, each including all of these performance metrics.

Over the course of the year, other decisions may be made. For example, a mortgage offer may have been made to the client. This mortgage offer would represent a new observation point. From this time on, performance data would be accumulated for that observation point. In January, 1999, observation points made in January 1998, can possibly be rolled off, depending on the user's desired parameters dictating how long performance is to be retained. Therefore, for example, the performance of the January, 1998, credit line increase decision has been tracked for twelve months, but it will not be tracked anymore. However, performance data will still be accumulated for the observation point where the mortgage offer was made. How long to accumulate and maintain performance data for a specific observation point is a matter of design choice. Common performance data may be captured once for multiple observations.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated how well a certain test group or category performed, instead of how well a specific client performed. Thus, strategy performance can be evaluated, instead of individual client performance.

As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 8. For example, by aggregating the data, we can view all the metrics, or results, associated with Bronze, test group 2. The user can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with those dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When doing the aggregation process, all possible permutations of dimensions are preferably determined. Then, the results of clients meeting these dimensions should be matched to these permutations.

For example, FIG. 12 is a diagram illustrating an example of a row of data having a dimensions part and metrics part, according to an embodiment of the present invention. Referring now to FIG. 12, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

The use of time dimensions, such as the dimensions of observation time and performance time, allows the movement between categories to be examined over time. Additionally, time allows for trend analysis and selective inclusion of performance points to access when a strategy has performed well/poorly.

Preferably, look-up tables are used for each of the dimensions, to appropriately and descriptively access the data, and to allow a system user to easily change strategy aggregation parameters which are subsequently reflected in the look-up tables.

For example, FIG. 13 is a diagram illustrating a look-up table for the test group dimension in the row illustrated in FIG. 12, according to an embodiment of the present invention. Referring now to FIG. 13, the look-up table includes a date column (DATE), a test group identifier column (TEST), and a description column (DESCRIPTION). A look-up table could be created for each of the dimensions of the row illustrated in FIG. 12. Moreover, a system user can define T1, T2, T3, . . . , and can add and delete tests as desired. Such changes can be made, for example, through a simple user interface, such as a graphical user interface. The ability to support changes in the values of the dimensions instantly and in response to user changes in strategy or policy is an aspect of the present invention.

Thus, the rows of data can be considered to be a data structure which is accessed to track the performance of a category.

Aggregation of dimensions to metrics via the use of rows, columns and look-up tables, and accessing the data as structured in a row, is preferably performed via well-known online analytical processing (OLAP) techniques and technology. Such use of OLAP techniques and technology is disclosed, for example, in related U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, and which is incorporated herein by reference.

The aggregated data can be used to determine the effectiveness of various strategies. For example, in the above-described manner, various strategies can be tested to determine whether the strategies are successful in moving clients to more desirable categories.

Aggregate comparisons of test and control strategies can mask important differences in strategy effectiveness. For example, two strategies may appear equally effective in terms of aggregate performance while they actual outperform each other for different segments of the client portfolio. This is most easily explained by way of the hybrid approach illustrated in FIG. 7.

Figure 7:
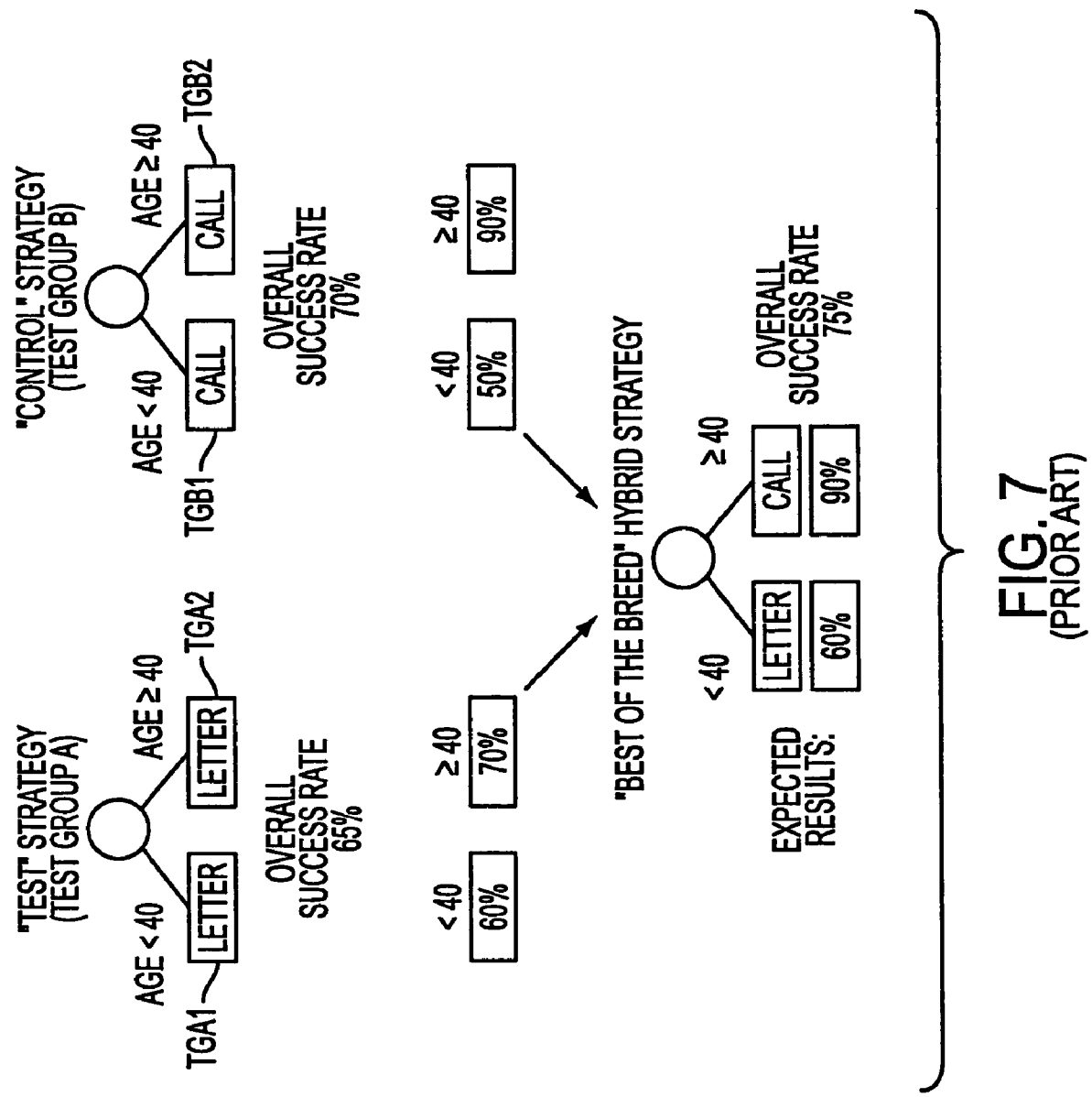
FIG. 7 (prior art) is a diagram illustrating a hybrid strategy in a decision management system.

Referring now to FIG. 7, an overall comparison of the results for the test strategy versus control strategy would indicate that the control strategy was superior (as measured by overall success rate). However, when strategy effectiveness is reported at the further segmented report group level (i.e., for each comparable path through test groups), it is possible to build a new hybrid strategy that will outperform either test or control by combining the best performing actions of each strategy.

In creating the infrastructure to create hybrid strategies, decision trees should preferably have the same structure for each test group, but could have different actions or decisions associated with each node. Then, a report group, because the tree structures are identical, can allow two or more identical paths to be associated with each other, independent of the test group. For example, instead of simply comparing the overall performance of test group 1 to test group 2, the same path in test group 1 can be compared to the same path in test group 2. This allows microanalysis of the strategy test cells, to determine which paths are performing very well or very poorly.

According to the above embodiments of the present invention, clients can be randomly assigned to a test group. Each test group has associated with it one or more strategies typically defined using decision trees. Each possible path through a decision tree can be "tagged" and the performance of all clients that went down that path can be monitored.

Report groups and categories can be considered to be different types of "tags." Report groups are preferable to tag paths in a single function set and provide measurement of just that path across all test groups/trees used in the respective function set. Categories provide similar functionality as report groups, but at an aggregate level. More specifically, the performance of a category is tracked as the cumulative performance of report groups assigned in strategy paths that were traversed after the assignment of the category.

Report groups define unique paths through a strategy and span test groups such that performance of path A in test group 1 can be compared with path A in test group 2. The rules associated with a given path should preferably be the same across two test groups, but the decisions assigned at the end of the path may vary by test group. As a result, the strategy experimentation function can be accelerated by not simply comparing two or more test groups to determine the best performer, but rather by measuring individual paths across two or more test groups such that a new hybrid strategy can be developed using the best performing paths of each test group.

As an example, assume that the following function sets will be executed in order: CATEGORY ASSIGNMENT, APPROVE/DECLINE DECISION, and CREDIT LIMIT ASSIGNMENT. In CATEGORY ASSIGNMENT, there are three paths used to segment customers into three categories: HIGH RISK, MEDIUM RISK and LOW RISK. Two test groups are then defined: TRADITIONAL (70%) and AGGRESSIVE (30%). The CATEGORY ASSIGNMENT tree is the same for both test groups since categories span test groups and vice-versa (i.e., a many to many relationship). However, the trees associated with the APPROVE/DECLINE and CREDIT LIMIT ASSIGNMENT function sets will have different decisions, depending on the test group.

For APPROVE/DECLINE, there are three paths through the decision tree, defined by report groups A, B and C. Similarly, there are three paths through the decision tree for CREDIT LIMIT ASSIGNMENT, defined by report groups D, E and F.

FIGS. 14(A), 14(B), 14(C) and 14(D) are diagrams illustrating the operation of a decision management system as applied to CREDIT LINE ASSIGNMENT, according to an embodiment of the present invention.

Referring now to FIGS. 14(A) and 14(B), as described above, 70% of customers are assigned to the test group TRADITIONAL, and 30% of customers are assigned to the test group AGGRESSIVE. Each test group has the same decision tree structure. There are three paths through the decision tree for CREDIT LIMIT ASSIGNMENT, defined by report groups D, E and F.

A decision management system according to the embodiment of the present invention provides the ability to measure the performance of each report group across test groups. For example, while at an aggregate level, assume that TRADITIONAL produced more profit than AGGRESSIVE. However, assume that the path/decision associated with report groups D and F in AGGRESSIVE generated more profit than the same path/decisions associated with report groups D and F in TRADITIONAL, as indicated by the "check mark" in FIG. 14(B) next to report groups D and F.

However, assume that report group E in TRADITIONAL was more profitable than the comparable paths/decision in AGGRESSIVE, as indicated by the "check mark" in FIG. 14(A) next to report group E. Rather than simply increasing the percentage of people assigned to TRADITIONAL, a new hybrid strategy can be defined and associated with a test group that uses the decision assigned for report groups D and F in AGGRESSIVE in conjunction with the decision assigned to report group E in TRADITIONAL. This new test group will be called, for example, TRADITIONAL_2. The overall profitability of TRADITIONAL_2 will be higher than either TRADITIONAL and AGGRESSIVE since it contains the best performing paths/decisions of each test group for the CREDIT LINE ASSIGNMENT function set. A similar procedure would be performed within APPROVE/DECLINE using report groups A, B and C, to develop an improved hybrid strategy for APPROVE/DECLINE.

To continue the example and relate it to categories, the performance of TRADITIONAL can be examined over time in moving more people into the LOW RISK category from the HIGH RISK category. This can be compared to the effectiveness of AGGRESSIVE at achieving the same objective (i.e., over time, moving more people into the LOW RISK category).

For example, FIGS. 14(C) and 14(D) each represent a matrix having the categories of HIGH RISK, MEDIUM RISK and LOW RISK on one axis, and the test groups TRADITIONAL and AGGRESSIVE on the other axis. Thus, these matrices have the same axes and values on the axes as the matrix in step 165 of FIG. 8. However, the matrix in step 165 in FIG. 8 is used to allocate customers to strategy test cells, whereas the matrix in FIGS. 14(C) and 14(D) are used to leverage performance metrics for each strategy test cell. More specifically, the matrices in FIGS. 14(C) and 14(D) are for viewing the movement of clients between categories. By contrast, the matrix in step 165 of FIG. 8 is for actual strategy execution versus strategy reporting.

As an example, assume that FIG. 14(C) represents a matrix based on data for January 1997, while FIG. 14(D) represents a matrix based on data for December 1997. As can be seen from comparing FIGS. 14(C) and 14(D), both test groups were effective in moving customers from the HIGH RISK category into the MEDIUM RISK and LOW RISK categories. Therefore, the company might consider permanently implementing these test group strategies. Moreover, hybrid strategies can be developed from test groups in the same category and possibly across categories. In this manner, strategies can be tested and implemented to move customers appropriately into different categories.

The effectiveness measurement of the categories is a direct function of aggregating the performance associated with the report groups assigned to the clients for the APPROVE DECLINE and/or CREDIT LIMIT ASSIGNMENT function sets.

A decision management system, according to embodiments of the present invention, can provide the ability to simulate strategies before the strategies are placed into production.

Figure 15:
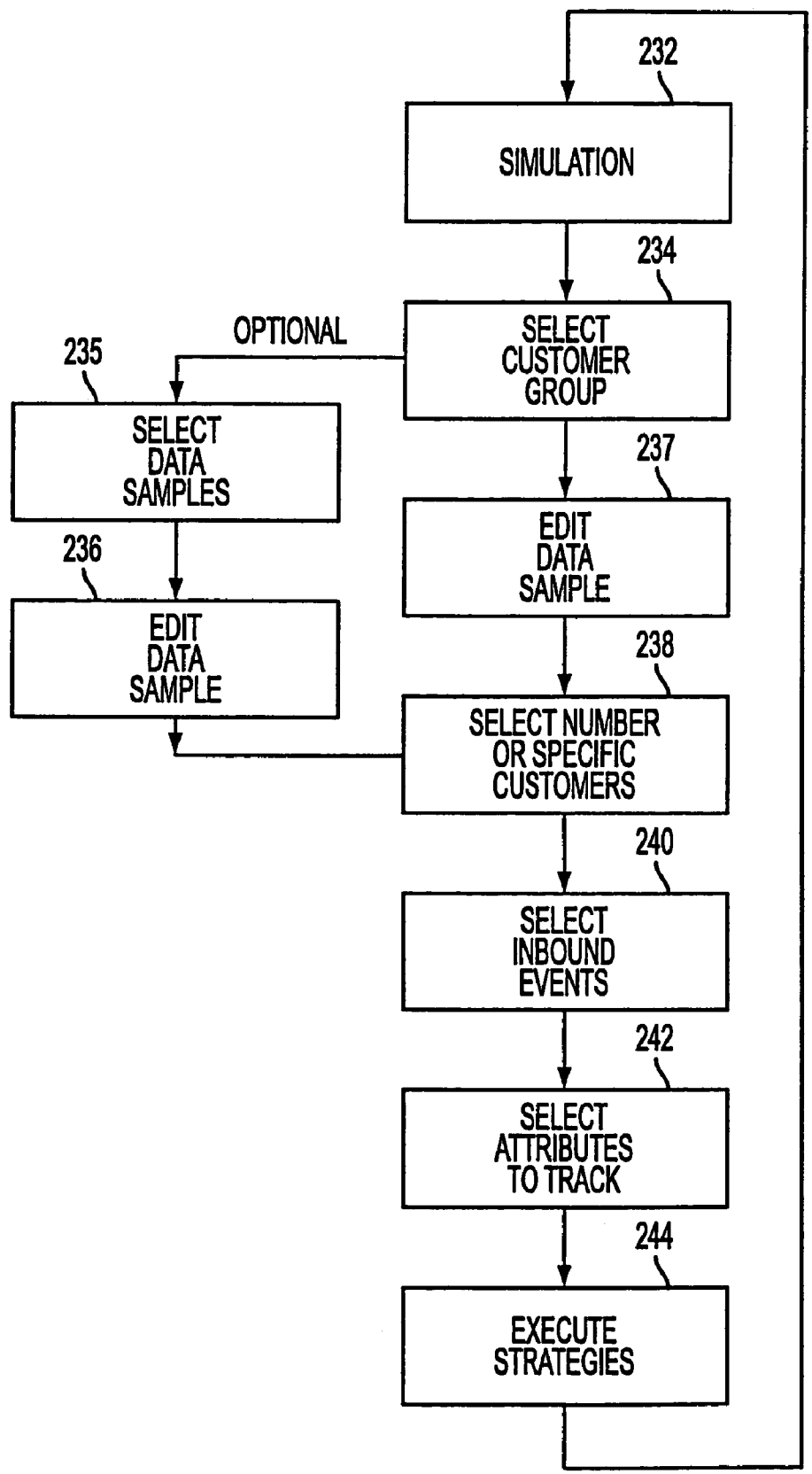
FIG. 15 is a diagram illustrating an overall simulation operation of a decision management system in optimizing strategy or policy based on results, according to an embodiment of the present invention.

For example, FIG. 15 is a diagram illustrating an example of a simulation operation of a decision management system for assessing qualitative client information at specific points in time, according to an embodiment of the present invention.

Referring now to FIG. 15, in step 232, the user indicates that a simulation is to be performed. From step 232, the operation moves to step 234, where the user selects a customer group (such as, for example, a segment) for which the simulation is to be performed. For example, assume that the decision management system creates and applies strategies for various systems, such as a loan originations system and a collections systems, and that the loan originations system divides customers into the segments of north, south, east and west, representing different geographic territories. In step 234, the user can select the loan originations system, and the north and south segments of that system. As a result, the simulation will be applied only to customers in the north and south segments of the loan originations system, and should not be applied to other segments or other systems. In step 234, selected customer groups are not intended to be limited to "segments". Instead, there are many ways to group customers, where these groups are selectable in step 234.

The user should be allowed to select different data samples against which the simulation will be run. For example, as illustrated in FIG. 15, an optional step 235 can be included to allow the user to select a data sample against which the simulation will be run. Thus, in step 235, the user can select whether the simulation will be run against currently loaded data and/or various different historical data samples without technical intervention. When the operation moves from step 234 to step 238 (described later), without passing through the optional step 235, the simulation typically will be run against data currently loaded in the decision management system for the selected customers.

Moreover, the user could be allowed to edit the data against which the simulation will be run. For example, in FIG. 15, step 236 and/or step 237 could be added, where each of these steps allows the user to select, for example, a customer/account from the data against which the simulation will be run, and edit the data associated with that customer/account. Editing data in steps 236 and 237 can potentially influence the "type" of customer/account, and thus how the customer/account traverses the strategy. While modifying the data no longer provides simulation against real-life data, it allows the user to create/edit hypothetical customers/accounts to ensure that specific branches of the strategy are evaluated as intended.

In step 238, the user selects the number of customers, or selects specific customers, of those in the group selected in step 234, for which the simulation will be performed. For example, the user can select fifty (50) customers to be randomly selected from the customer group identified in step 234. Alternatively, the user can select specific customers (such as customers "John Smith", "Bill Jones" and "Mary Adams"). Of course, step 238 can be skipped altogether, and the simulation performed for all customers in the group selected in step 234. In a typical case, step 238 is performed to limit the number of customers in the simulation.

From step 238, the operation moves to step 240, where the user selects specific inbound events for which the simulation will be initiated. For example, for the loan originations systems, inbound events might include a request by the customer for a loan approval, a loan amount increase, or a decrease in the interest rate. The decision management system typically will include a data structure, such as a table, listing the valid inbound events for each grouping of clients in each system. Therefore, the data structure should list the inbound events for the north and south segments of the loan originations system. In step 240, the user selects inbound events from this data structure, to thereby identify inbound events for which the simulation will be run.

From step 240, the operation moves to step 242, where the user selects attributes to be tracked during the simulation. For a loan originations system, such attributes might include, for example, risk score, balance, loan limit and delinquency score, for each respective customer. Attributes might also include aggregate customer debt and debt/ratio percentage. In this example, it will be assumed that the risk score is being tracked. Therefore, the user selects risk score in step 242.

From step 242, the operation moves to step 244, where simulation strategies are executed against the appropriate data sample in accordance with the parameters selected in steps 234 through 242. From step 244, the operation returns to step 232 so that, if desired, additional simulations can be run and/or the results of a run can be viewed. Therefore, the operation in FIG. 15 keeps looping until all desired simulations (or "runs") are completed.

Figure 16:
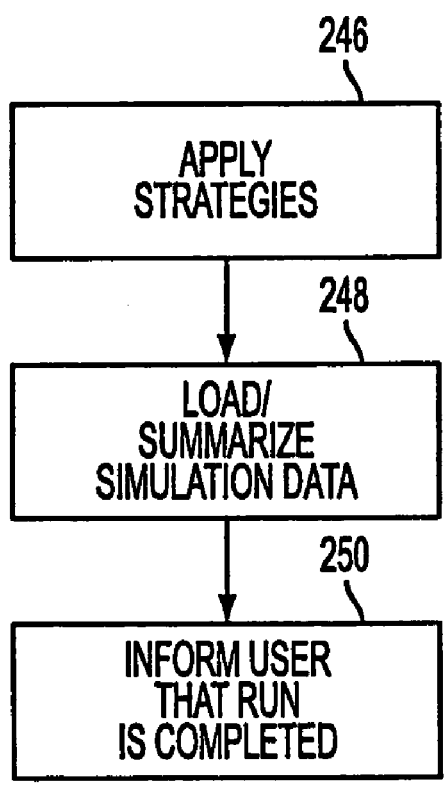
FIG. 16 is a diagram illustrating the execution of simulation strategies in the simulation operation in FIG. 15, according to an embodiment of the present invention.

FIG. 16 is a diagram illustrating the execution of simulation strategies in the simulation operation, according to an embodiment of the present invention. More specifically, FIG. 16 is a diagram illustrating the operations performed in step 244 in FIG. 15.

Referring now to FIG. 16, in step 246, the strategies for the simulation are applied to the customers selected in steps 234 through 238 of FIG. 15, and for the inbound events selected in step 240 of FIG. 15. Thus, step 246 essentially performs steps 170 and 180 in FIG. 8 for the simulation strategies. As a result, for the inbound events selected in step 240 in FIG. 15, the corresponding function sets are executed, thereby generating simulation data. The generated data might include, for example, a tree ID (identifying a specific decision tree traversed by the customer), a system ID (identifying the system, such as the loan originations system for the simulation), a segment ID (identifying the segment of the customer), a node ID (identifying the specific node being monitored for the simulation), a risk score (identifying the value of the risk score attribute being tracked), and a test group (identifying the test group of the customer). The simulation data is stored in memory within the execution environment.

From step 246, the operation moves to step 248, where the stored simulation data is summarized and loaded into a database where a GUI can access the results. For example, a run ID would typically be added to the simulation data in step 248, to identify the respective simulation run. The simulation data would then be summarized by properly indexing the data into data structures (such as, for example, relational tables in a relational data model) suitable for reporting and analyzing the data. For example, assuming that the simulation data will later be analyzed in either an aggregate reporting environment (that is, analyzing the aggregate results) or a detailed reporting environment (that is, analyzing in accordance with detailed, non-aggregate information, such as that relating to a specific customer), the data structures used in step 248 might include a relational table labeled "aggregate", and a relational table labeled "detail". The aggregate table might include the columns of run ID, tree number, node number, and data accumulated/averaged for each node in the respective tree. The detail table might include the columns of run ID, description, customer, user, time and date, customer segment and strategy result, to identify the specific details related to the simulation run. The run ID might be used to link the aggregate table and the detail table. However, different links could easily be used. A separate relational table might be used to list the run ID for all the different runs, so that each run can be easily accessed and linked to other tables as appropriate.

From step 248, the operation moves to step 250, where the user is informed that the simulation run is complete. Further, the overall operation in FIG. 16 can be continuously monitored, and this status relayed to the user in step 248. For example, the user can be continuously updated as the simulation run is, for example, 10% complete, 20% complete, . . . , 100% complete.

Therefore, by repeatedly executing the operations in FIGS. 15–16, a plurality of runs are created, each run having its own run ID to identify the respective run.

Figure 17:
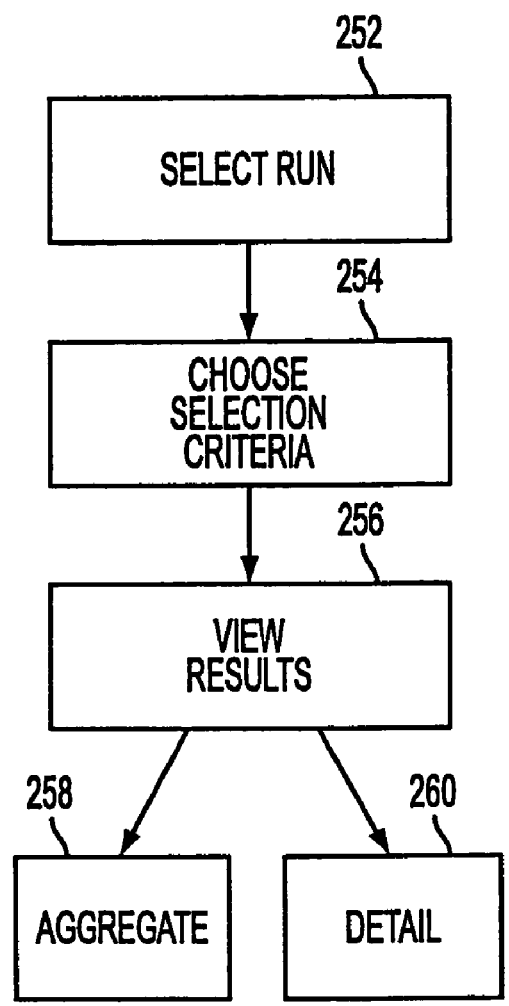
FIG. 17 is a diagram illustrating details for displaying the results of the simulation operation in FIG. 15, according to an embodiment of the present invention.

FIG. 17 is a diagram illustrating an operation for displaying the results of the runs created in FIG. 15, according to an embodiment of the present invention. Thus, the operation in FIG. 17 is performed after runs are created in FIG. 15.

Referring now to FIG. 17, the operation starts in step 252, where the user selects a respective run to display. For example, the user may be able to specify or choose the run ID of a run created in FIG. 15, to thereby select that run.

From step 252, the operation moves to step 254, where the user can choose selection criteria to display. For example, the user can choose the system, segment, etc., to display.

From step 254, the operation moves to step 256, where the results of the simulation (that is, the selected run) are displayed. Here, the user can display either the aggregate results or the detailed results of the run. If the aggregate results are to be displayed, the operation moves to step 258. If the detailed results are to be displayed, the operation moves to step 260.

In step 258, the aggregate results for the simulation are displayed. For example, the aggregate results might include the average of the results for a specific node in a specific decision tree where all customers going through the node are aggregated to produce results. Such aggregate results might indicate, for example, that there were 100 customers in the simulation, of which 16 passed through the node, and the average risk score of these 16 customers is 275.

In step 260, detailed, non-aggregate, results for the simulation are displayed. For example, the detailed results might display the results for a specific, selected customer, such as the report group traveled by that customer, and the decision made with respect to that customer. OLAP technology is preferably used to display the detailed results in step 260.

Further, the display of the aggregate results in step 258 preferably allows the user to also display detailed results, in addition to aggregate results. For example, step 258 might also display the results for a specific, selected customer, such as the report group traveled by that customer, and the decision made with respect to that customer.

Therefore, as can be seen from the above, aggregate results are multi-client (such as multi-customer) results, whereas detailed results are client (such as customer) specific results.

OLAP technology is preferably used to display the detailed results in step 260. By contrast, OLAP technology would not typically be necessary to display the aggregate results in step 258, but might be used if results were being compared across simulation runs. The use of OLAP technology is known, and a person of skill in the art would understand how to apply OLAP technology to display the detailed results in step 260.

Therefore, via the simulation in FIGS. 15–17, the decision management system can provide the ability to simulate strategies before the strategies are placed into production. More specifically, the decision management system can provide strategy simulations which assess qualitative account/customer information at specific points in time. Such simulations provide the ability to execute, validate and refine decision strategies separately from the production environment by executing a sample of accounts/customers against specified strategies in a non-production environment. Thus, a stand alone strategy development environment can be provided where a sample of production data is used to iteratively modify respective parameters, execute simulation, and evaluate the results at each decision prior to updating the production environment with enhanced strategies. Strategies can be tested prior to roll-out and expected results can be validated through this estimation of the impacts and benefits. Such simulation provides the level of detail required by executives to understand the impact of the strategies to be deployed through (a) comparing simulation results (decisions) to historic customer data, (b) monitoring of node-level attributes, (c) visually auditing customers passing through decision trees, and (d) reporting simulation results.

Therefore, simulation can provide qualitative client (for example, account and/or customer) assessment via point-in-time simulation. Here, "qualitative" client assessment refers to the operation of tracking and assessing attributes of clients to determine the type of client passing through any specific node or part of a strategy. Thus, attributes of the clients are selected and tracked. This helps the user to understand "who" is traversing the strategy and getting which decisions and is different from report groups in that it allows tracking at all nodes simultaneously, tracks the "type" of customer/account versus strategy performance, and allows for detailed customer-level analysis rather than aggregate analysis of strategy path performance. By having this information, the user is able to confidently develop effective strategies. Therefore, simulation provides a measurement for quantitatively assessing the "type" of clients traversing through strategies during the simulation and the expected results of applying such strategies.

Strategies can be simulated from the user's desktop in an environment independent of the production environment and information technology (IT) services. Simulation, by using a sample of production customer data, provides a manner of interactively evaluating and modifying decision strategies outside of the production environment.

Therefore, the simulation in FIGS. 15–17 provides point-in time simulation, and simulation which is at the customer or account level. In other words, the simulation allows the user to determine the "type" of client that went through a part of a strategy, before the strategy is placed in production. This concept of determining the "type" of customer is different than that of a report group.

For example, report groups are used to track the aggregate performance over time of a path through a strategy. Report groups focus on "performance". For example, report groups indicate how well a path performed. Report groups are used over time. Generally, as the period of time increases, the amount of data collected will increase and the report group becomes more accurate and valuable. A report group might measure performance, for example, over a three month period.

As another example, report group A may be associated with path 1. Thus, report group A indicates the performance of path 1. Path 1 may be an "approved" decision to approve a customer for a credit card. Report group A may be used to measure the number of delinquencies of all customers who came through path 1 in the first six months of having the credit card (thus tracking performance over time). As can be seen from this example, report group A measures performance over time by accumulating results.

By contrast, a simulation as in FIGS. 15–17 represents an instantaneous, point-in-time analysis. For example, the simulation determines that, on Dec. 1, 1998, a specific type of customer (such as a high risk customer) traveled through a certain portion of the strategy. Thus, the simulation indicates "who" came down through a specific path. For example, the simulation indicates the average risk level of each customer that went down the path. Moreover, the user can interactively pick what characteristic (such as the risk level) to be tracked.

Thus, the simulation in FIGS. 15–17 indicates "who" (and "how many") traversed a certain part of a strategy, and indicates their value for any attribute the user selects to be tracked. From this, one can determine the point in time of impact of implementing the policy (i.e., there are 20,000 high risk customers that will go through this node in production). For example, the simulation indicates the risk score of a respective customer traversing a certain part of a specific strategy. This risk score for this customer should remain the same throughout the strategy.

Moreover, at any decision point (i.e., node) in a strategy, the simulation can indicate the aggregate, or average value of any user selectable attribute for all clients that came through the decision point. For example, if the risk score is a customer attribute being tracked, the average risk score will change at each point in the strategy as customers drop out of, or take different routes through, the strategy.

The simulation is based on a sample of current production data or historical data to validate a strategy before the strategy is put into production. It may also be possible to perform a simulation during production and/or on all of the current production data. However, in this case, the cost/amount of the required processing power might be too high, such that this approach might not be feasible. This is due to simulation tracking more detailed data than production.

The simulation in FIGS. 15–17 provides the user with great flexibility. For example, the user can flexibly designate what attributes will be tracked (see, for example, step 242 in FIG. 15). In addition, the user can flexibly designate what inbound events to simulate (see, for example, step 240 in FIG. 15), so that only function sets corresponding to the selected inbound events will be executed (for example, see step 246 in FIG. 16).

The simulation in FIGS. 15–17 allows historical information to be used in simulation (see, for example, step 235 in FIG. 15). For example, a sample of 1000 customers can be taken on the present day, thereby indicating a current sample. However, a historical sample may have been taken six months ago of the same 1000 customers. This historical sample can be used for simulation. The data from the historical sample can be tracked during a simulation on the current sample. Additionally, simulation could possibly be run on the historical sample.

Therefore, via simulation, a user can track attributes of customers going down a specific part of a strategy. For example, assume it is expected that high risk customers will go through path 1 represented by report group A of a specific strategy. Via simulation, the current risk of any customer coming through path 1 can be tracked. The risk of the same customers six months ago can also be simultaneously tracked via simulation incorporating a historical sample.

If a strategy is designed, for example, for high risk customers, it may be desirable to ensure that these high risk people will actually travel through the strategy. By performing simulation on a current and/or historical sample, it can be ensured that the high risk customers will travel through the strategy as expected.

A graphical user interface (GUI) can be used to enter information for the simulation, thereby allowing a simulation to be performed without technical intervention.

Figure 18:
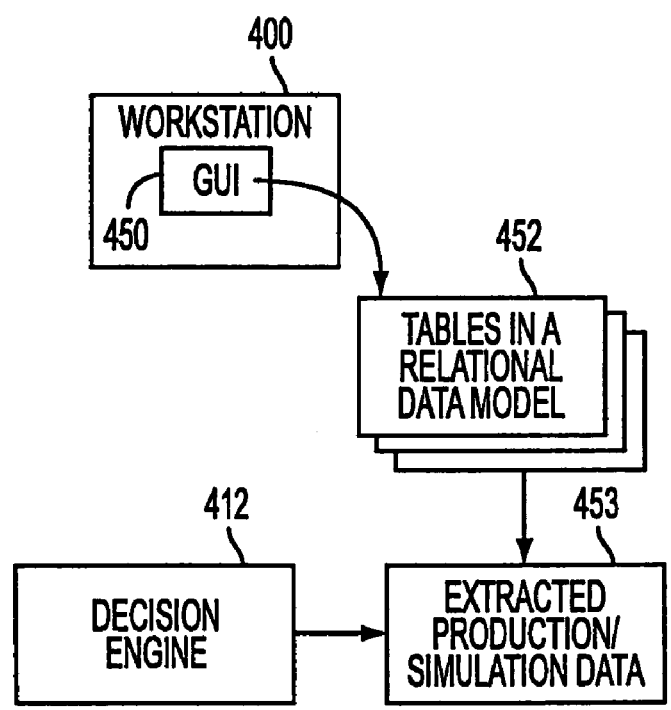
FIG. 18 is a diagram illustrating the use of a graphical user interface (GUI) and tables in a relational data model to enter information for a simulation, according to an embodiment of the present invention.

For example, FIG. 18 is a diagram illustrating the use of a GUI and tables in a relational data model to enter information for a simulation, according to an embodiment of the present invention. Referring now to FIG. 18, a system user enters strategies, and simulation parameters by entering information in a GUI 450 running, for example, on a workstation 400. The simulation parameters can include, for example, the selection of customers in step 234 of FIG. 15, the selection of data samples in step 235 in FIG. 15, the selection of a number or specific customers in step 238 in FIG. 15, the selection of inbound events in step 240 in FIG. 15, the selection of attributes in step 242 in FIG. 15, the selection of a run in step 252 in FIG. 17, and/or the choosing of selection criteria in step 254 in FIG. 17. The strategies and simulation parameters entered in GUI 450 are stored in data structures of a data model 452. Such data structures can be, for example, relational tables, such as, for example, look-up tables. A decision engine 412 retrieves extracted data from extracted production/simulation data 453, and performs appropriate operations. The design of a GUI for entering information stored in a relational data model would be understandable by a person of skill in the art.

The use of GUI 450 and a relational data model allows a user to enter simulation parameters and control a simulation without technical intervention. Here, the term "without technical intervention" indicates that the information can be entered, selected and applied without changes to the software's code and/or environment in which it operates that would require a technical understanding of the product's architecture or leveraged technology. In other words, new software code does not have to be written, for example, to enter simulation parameters or modify existing simulation parameters. Instead, for example, the entering of simulation parameters is driven by the system user through the use of a GUI and relational tables. This allows a system user to change and define simulation parameters via, for example, a simple graphical user interface or other type of user interface, instead of requiring a software programmer to create or change the written software code, modify technical environments and/or physically move data structures.

Therefore, the selection of current attributes to be tracked during the simulation can be performed flexibly and without technical intervention. For example, in step 242 of FIG. 15 and via the use of a GUI and a relational data model, the user may be able to select the attributes of balance, risk score, delinquency and credit limit from an attribute table for a loan originations system.

Moreover, individual simulation runs can be saved and reexamined. As a result, a new simulation run does not have to overwrite a prior simulation run. Such saving and reexamining of runs can be performed in a flexible manner without technical intervention. For example, in step 248 in FIG. 16, individual runs can be provided with corresponding run IDs (or other such identification information). A table might be used to reference the individual runs by the run IDs. Then, in step 252 of FIG. 17, these individual runs can be selected via, for example, a GUI and a relational data model, for display and analysis. OLAP technology can also be used with a multidimensional data structure to view the results.

In addition, a user can flexibly select which customers or accounts to run the simulation against. Such selection can be performed without technical intervention. For example, in step 238 of FIG. 15, the user can select a number of customers against which the simulation will be run. For example, the user can indicate that the simulation should be run against 135 randomly selected customers out of the total of 1000 customers available for the simulation. Or, the user can select specific customers against which the simulation will be run. Alternatively, the user might be able to select specific groupings, or characteristics of customers (such as "high risk"), to identify a group of customer against which the simulation will be run. Such selection can be performed by the user via, for example, a GUI and a relational data model.

The user can also flexibly select inbound events and associated function sets that will be triggered during the simulation, without technical intervention. For example, in step 240 of FIG. 15, the user can select inbound events via a GUI and a relational data model.

In addition, the user can select attributes from a historical file that is cross-referenced to the client data sample being used to execute the strategy. For example, social security number might be used to determine if there is historical data corresponding to the current customer sample data. If there is historical data for the social security number of a current customer, a strategy can be designed based on the current data.

The user can also load or reload samples of data against which simulations can be run. Such samples can include, for example, several historical samples and a current sample. For example, in step 235 of FIG. 15, the user can flexibly select among the different samples. Such selection can be performed without technical intervention via a GUI and a relational data model.

The user has the ability to interactively select customer groups, strategy function sets, strategy functions or decision nodes, to view detailed or aggregate results for the selected items. For example, the user can view the results for a specific function set, node, etc.

Simulation is not limited to decision trees or any other type of decisioning structure. Moreover, simulation can be performed for any system, segment, category, function set or function. A function can be any type of function, such as nodes of a tree, cells of a matrix or decision points in a directed graph (that is, a decision tree where multiple branches may lead to the same node).

Simulation can be performed in many different manners. Thus, simulation is not intended to be limited to the specific operations in the specific orders disclosed in FIGS. 15–17.

The various processes, procedures, methods and operations described herein are preferably embodied in software, which can be run on many different hardware configurations.

Figure 19:
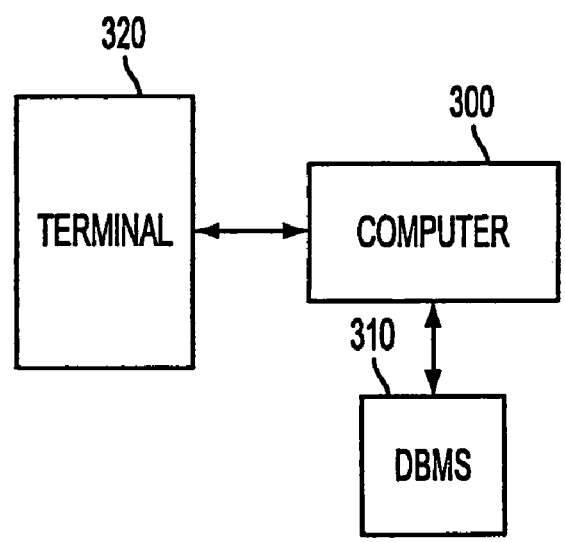
FIG. 19 is a diagram illustrating a simplified hardware architecture of a decision management system, according to an embodiment of the present invention.

FIG. 19 is a diagram illustrating a simplified hardware architecture of a decision management system, according to an embodiment of the present invention. Referring now to FIG. 19, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. There are many different types of hardware configurations, including many different types of client/server architectures, which can be used. Such hardware configurations would be understood by a person of skill in the art.

Figure 20:
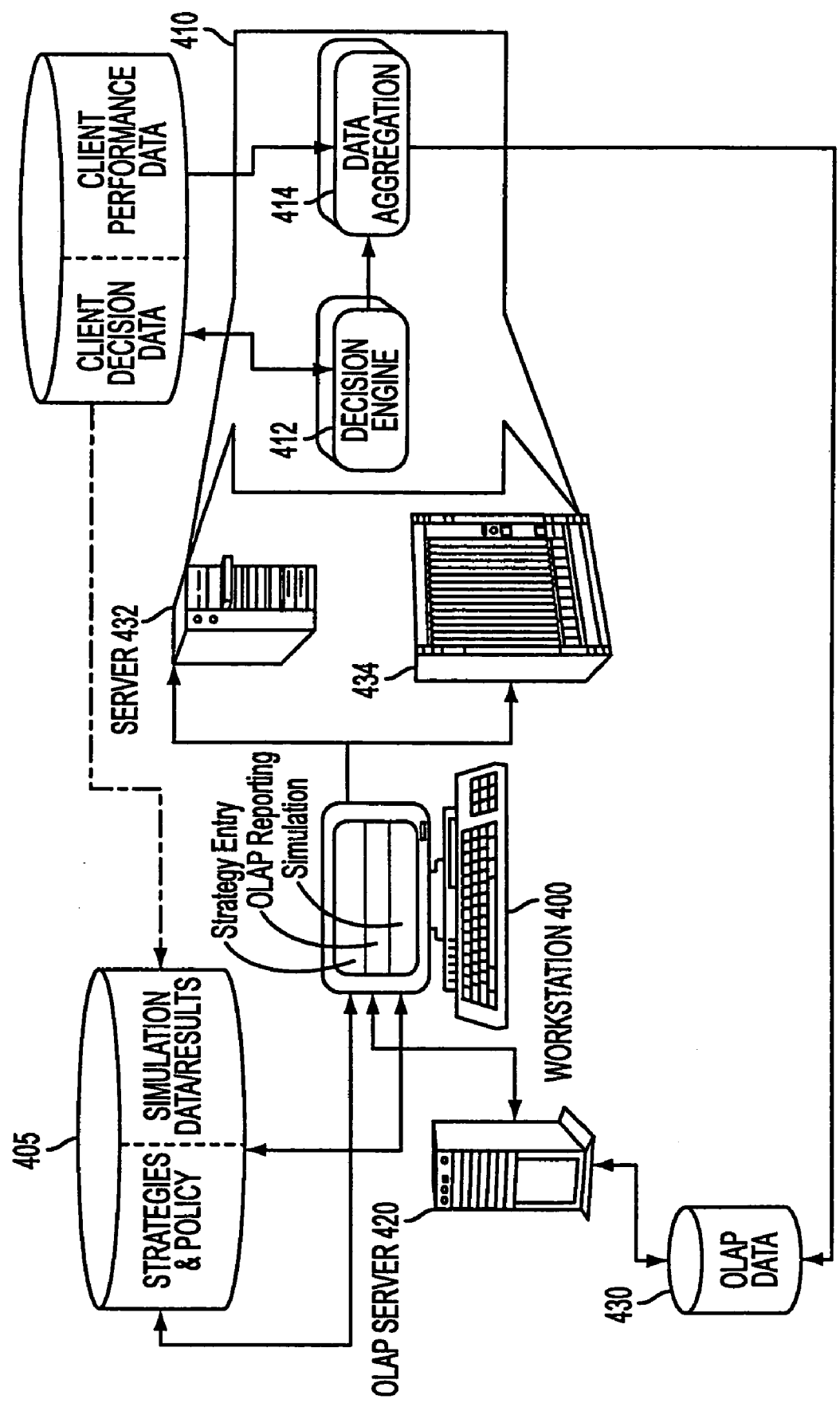
FIG. 20 is a diagram illustrating a more detailed hardware architecture of a decision management system, including the distribution of the system software, according to an embodiment of the present invention.

FIG. 20 is a diagram illustrating a more detailed hardware architecture of a decision management system, according to an embodiment of the present invention. Referring now to FIG. 20, a workstation 400 (which may be the same as workstation 400 in FIG. 18) provides a centralized user interface through which a strategy analyst can control the system. The primary purpose of workstation 400 is to enable the entry, maintenance and propagation of decision strategies and simulation parameters to a decision engine/data aggregation platform 410 which includes a decision engine 412 and a data aggregation component 414. These strategies reside in a relational data model 405 while they are being edited, maintained, and selected for simulation/production. Workstation 400 also provides access to OLAP analysis and reporting systems, possibly via an OLAP server 420, and consistently using an OLAP database 430. A server 432 and a mainframe 434 typically run different processing modes, and provide the processing power for decision engine/data aggregation platform 410.

Decision engine 412 deploys the business decisioning rules and simulation parameters entered on workstation 400 against client data. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

According to the above embodiments of the present invention, a decision management method and apparatus (a) assigns clients of an organization into categories and test groups so that the clients are conceptually representable in a data structure equivalent to a matrix having first and second axes with the categories on the first axis and the test groups on the second axis, the intersection of each category and test group in the matrix defining a test cell; (b) applies different strategies to clients within different test cells; and (c) tracks the movement of clients between categories as a result of the applied strategies.

As indicated above, the clients are "conceptually representable" in a data structure equivalent to a matrix. Thus, it is not necessary to physically create a matrix. Instead, the strategies should simply be applied to the clients in a manner which corresponds to that "conceptualized" by the matrix.

The test groups and categories are not intended to be limited to the specific examples included herein, and instead can be flexibly designed, for example, based on the business of the organization. For example, Bronze, Gold and Platinum are described herein as being categories. However, the present invention is not intended to be limited to use with these specific category names. Moreover, the applied strategies are not intended to be limited to any specific decision tree structure described herein as an example.

According to the embodiments of the present invention, a decision management apparatus includes a simulator and a tracking device. The simulator simulates the effect of a strategy by applying the strategy to client data. The tracking device tracks what type of client traveled through a respective decision point in the strategy during the simulating. A computer system which performs the overall operations in FIGS. 15–17 would function as such a simulator and tracking device. Moreover, a computer system which performs the overall operations in FIGS. 15–17 would generally be considered to be a decision management apparatus for implementing embodiments of the present invention.

A decision management system according to the above embodiments of the present invention allows strategies to be developed which move clients of an organization from one category of clients to another. Different strategies are applied to clients within different strategy test cells. Then, the movement of clients between strategy test cells can be monitored, so that the strategies can be appropriately modified to control the movement of clients between categories.

The present invention is not intended to be limited to controlling the movement of clients across categories, and movement is not the only reason to apply strategies. Instead, strategies can be applied, for example, simply to increase the client value over time to the organization. For example, two distinct report groups may result in different delinquency rates for clients of a company. Changing the overall strategy to include the strategy which yields the lower delinquency rate does not necessarily imply movement of a client across client categories. The client may stay, for example, in a "Bronze" category, but the overall effectiveness of the portfolio of clients may have been statistically improved. Therefore, in this example, the client value over time to the company has been increased.

A decision management system according to the above embodiments of the present invention is significantly different and more evolved than the system described in FIGS. 1–7. For example, the system described in FIGS. 1–7 does not create or conceptualize a data structure equivalent to a matrix of categories and test groups, and thereby does not allow different strategies to be applied to different strategy test cells of the matrix. Further, a system as described in FIGS. 1–7 does not track movement of clients between categories, or modify strategies based on the tracked movement to control movement of clients between categories. In addition, a system as described in FIGS. 1–7 has no OLAP capability to perform multidimensional analysis on strategy results or simulation results and thus explain positive/negative strategy performance. Also, a system as described in FIGS. 1–7 does not provide qualitative client assessment via point in time simulation. Therefore, a system as in FIGS. 1–7 cannot provide advantages of the present invention. Instead, it is limited to very tactical analysis.

Various flow charts are used herein to describe the operation of the present invention. These flow charts illustrate examples of the present invention, and it should be understood that these flow charts can easily be modified to illustrated changes which are encompassed by the embodiments of the present invention. For example, in various of the flow charts, various of the steps can be performed in a different order, and many of the steps can be eliminated or added to various embodiments of the present invention. Such changes should be considered to be within the spirit and scope of the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method for applying strategy decisioning criteria to a client population of an organization, comprising:

associating each client in the client population with a category, wherein each category is comprised of a grouping of clients based upon at least a value to the organization for the grouping of clients as compared to other groupings of clients, and wherein different rules are applied in executing decisions for at least some inbound events associated with clients depending upon the category in which the respective client is associated;

creating a plurality of test groups for a plurality of categories by randomly assigning clients to a test group in each client's respective category, wherein different strategies are utilized for applying the different rules for executing decisions;

evaluating client performance in each category across different test groups;

refining the strategies; and using the refined strategies for applying different rules to improve client performance according to results of the client performance evaluation.

2. The method of claim 1, further comprising the steps of:

moving certain clients between categories when the outcome of an accumulation of particular decisions associated with a respective client results in changing the value to the organization attributed to the client to one that is associated with a different category; and tracking the movement of clients between categories, wherein strategies are refined such that clients change categories in a manner that further improves client performance as compared to an original implementation of the respective strategies.

3. The method of claim 1, wherein strategies are based upon decision tree structures, and the same tree structure is applied across each category.

4. The method of claim 3, wherein each test group experiences a different tree structure.

5. The method of claim 4, wherein the step of refining strategies is performed by implementing hybrid strategies that combine paths of decision tree structures from different test groups for different categories.

6. The method of claim 5, wherein client performance is evaluated by tagging paths through a strategy, and the hybrid strategies that are implemented utilize the best individual performance for each category across the plurality of test groups.

7. The method of claim 1, wherein the step of evaluating client performance occurs by periodically aggregating client performance data into different permutations of numerically comparable performance metrics.

8. The method of claim 1, wherein clients are customers of a credit card company, and categories correspond to different customer credit levels.

9. A method for applying strategy decisioning criteria to a client population of an organization, comprising:

associating each client in the client population with a category, wherein each category is comprised of a grouping of clients based upon at least a value to the organization for the grouping of clients as compared to other groupings of clients, and wherein different rules are applied in executing decisions for at least some inbound events associated with clients depending upon the category in which the respective client is associated;

creating a plurality of test groups for a plurality of categories by randomly assigning clients to a test group in each client's respective category, wherein different strategies are utilized for applying the different rules for executing decisions; and moving certain clients between categories when the outcome of an accumulation of particular decisions in different test groups associated with a respective client results in changing the value to the organization attributed to the client to one that is associated with a different category.

10. The method according to claim 9, further comprising the steps of:

tracking the movement of clients between categories; and refining strategies such that clients change categories in a manner that further improves client performance as compared to an original implementation of the respective strategies.

11. The method of claim 10, wherein strategies are based upon decision tree structures, and the same tree structure is applied across each category.

12. The method of claim 11, wherein each test group experiences a different tree structure.

13. The method of claim 10, wherein the step of refining strategies is performed by implementing hybrid strategies that combine paths of decision tree structures from different test groups for different categories.

14. The method of claim 13, wherein client performance is evaluated by tagging paths through a strategy, and the hybrid strategies that are implemented utilize the best individual performance for each category across the plurality of test groups.

15. The method of claim 14, wherein client performance is evaluated by periodically aggregating client performance data into different permutations of numerically comparable performance metrics.

16. The method of claim 10, wherein clients are customers of a credit card company, and categories correspond to different customer credit levels.

* * * * *